US00RE41944E

(19) United States
(12) Reissued Patent
Matsutani et al.

(10) Patent Number: US RE41,944 E
(45) Date of Reissued Patent: Nov. 23, 2010

(54) METHOD FOR MANUFACTURING NOBLE METAL ELECTRIC DISCHARGE CHIPS FOR SPARK PLUGS

(75) Inventors: Wataru Matsutani, Aichi (JP); Osamu Yoshimoto, Aichi (JP); Yoshihiro Matsubara, Mie (JP)

(73) Assignee: NGK Spark Plug Co., Ltd., Aichi (JP)

(21) Appl. No.: 12/257,543

(22) Filed: Oct. 24, 2008

Related U.S. Patent Documents

Reissue of:
(64) Patent No.: 7,131,191
Issued: Nov. 7, 2006
Appl. No.: 10/823,662
Filed: Apr. 14, 2004

(30) Foreign Application Priority Data

Apr. 15, 2003 (JP) ..... 2003-110133

(51) Int. Cl.
*H01R 43/16* (2006.01)
*B21F 45/00* (2006.01)
*H01T 13/39* (2006.01)
*H01T 21/02* (2006.01)

(52) U.S. Cl. ..... 29/825; 29/33 N; 29/527.6; 29/527.7; 29/874; 72/700; 445/7

(58) Field of Classification Search ..... 29/33 N, 29/526.2, 526.3, 527, 527.1–527.7, 592.1, 29/825, 874, DIG. 5, DIG. 10, DIG. 15; 72/286, 72/700; 313/141, 143; 445/7
See application file for complete search history.

(56) References Cited

U.S. PATENT DOCUMENTS 5,395,273 A * 3/1995 Matsutani ..... 445/7
5,869,921 A * 2/1999 Matsutani et al. ..... 313/141
5,977,695 A * 11/1999 Osamura et al. ..... 313/141
6,093,071 A * 7/2000 Osamura et al. ..... 445/7

FOREIGN PATENT DOCUMENTS

| | | | |
|---|---|---|---|
| JP | 7-268574 | | 10/1995 |
| JP | 10-32076 | | 2/1998 |
| JP | 2000-331770 | | 11/2000 |
| JP | 2000331770 A | * | 11/2000 |
| JP | 2002173701 A | * | 6/2002 |
| JP | 2002-173701 | | 6/2002 |
| JP | 2002-299005 | | 10/2002 |
| JP | 2002-346625 | | 12/2002 |
| JP | 2003-53419 | * | 2/2003 |
| JP | 2003053419 A | * | 2/2003 |

OTHER PUBLICATIONS

Search Report for GB0408438.0 dated Aug. 4, 2004.*

* cited by examiner

*Primary Examiner*—A. Dexter Tugbang
*Assistant Examiner*—Livius R Cazan
(74) *Attorney, Agent, or Firm*—Sughrue Mion, PLLC

(57) ABSTRACT

In a wire drawing process for forming a wire rod containing iridium as a main component and which further contains nickel and at least one of platinum, rhodium and ruthenium, and having a cross-sectional area of not smaller than 0.05 $mm^2$ and not larger than 1.2 $mm^2$. The worked material is continuously heated red hot and/or white hot in a heating region 103 extending up to 60 mm from the work inserting surface 101a of a die 101 in a direction opposite that in which the work 102 moves, the work being heated to a temperature of 1000 to 1150° C. at a temperature measuring position 105 which is removed from the work inserting surface 101a by 20 mm. Furthermore, the temperature in the region 106 extending from the temperature measuring position 105 to the work inserting surface 101a is set to not lower than 1000° C., and the wire drawing rate is set to 300 to 1600 mm/min.

7 Claims, 4 Drawing Sheets

METHOD FOR MANUFACTURING NOBLE METAL ELECTRIC DISCHARGE CHIPS FOR SPARK PLUGS

Matter enclosed in heavy brackets [ ] appears in the original patent but forms no part of this reissue specification; matter printed in italics indicates the additions made by reissue.

CROSS-REFERENCE TO RELATED DOCUMENTS

The present application claims priority to Japanese Patent Application Number 2003-110133 filed Apr. 15, 2003, incorporated herein by reference in its entirety.

BACKGROUND OF THE INVENTION

1. Field of the Invention

The present invention relates to a method of manufacturing noble metal electric discharge chips adapted for use in long life spark plugs, and to a method for manufacturing the spark plugs.

2. Description of the Related Art

In order to secure the spark wear resistance required of a spark plug, an iridium alloy having a high melting point has been employed as a material for noble metal electric discharge chips. However, an iridium alloy containing iridium as a main component and containing metals other than iridium in an amount of not higher than 35% by mass is very difficult to plastically deform. There is a method (for example, JP-A-10-32076, referred to herein as Patent Document 1; and JP-A-200-33170, referred to herein as Patent Document 2) of forming noble metal electric discharge chips having a small cross-sectional area by subjecting an ingot of such an alloy containing iridium as a main component to hot processing.

However, when an iridium alloy is subjected to hot processing as disclosed in Patent Documents 1 and 2, the occurrence of cracks, and the disconnection and folding over of portions during the wire drawing operation, cannot be sufficiently prevented. As a result, it is difficult to adequately improve the manufacturing yield of discharge chips.

SUMMARY OF THE INVENTION

The present invention has been made in view of the above-mentioned problems of the prior art, and an object of the invention is to provide a method of manufacturing noble metal chips and spark plugs comprising the noble metal electric discharge chips, capable of improving the yield of noble metal electric discharge chips formed from an iridium alloy which is very difficult to plastically deform.

The above object of the present invention has been achieved by providing a spark plug having a central electrode, an insulator covering an outer surface of the central electrode with a free end portion of the central electrode being exposed, a main metal member retaining the insulator, and an earth electrode fixed to the main metal member and having an opposing portion forming a discharge gap between the earth electrode and the free end portion of the central electrode, either the free end portion of the central electrode or the opposing portion of the earth electrode or both produced by subjecting an ingot of an iridium alloy containing not lower than 0.5 mass % and not higher than 35 mass % of a metal other than iridium to wire drawing in which a wire rod having a cross-sectional area of not smaller than 0.05 $mm^2$ and not larger than 1.2 $mm^2$ is formed via a rolling step, and by cutting the wire rod to a predetermined length.

The characteristic feature of this wire drawing process is that a portion of the worked material is continuously red heated and/or white heated in a heating region of the worked material extending from a work inserting surface (i.e., the surface of a die used for wire drawing and into which the worked material is inserted) to a position of predetermined distance opposite the work moving (i.e., wire drawing) direction. The worked material is maintained at not lower than 1000° C. and not higher than 1150° C. at a temperature measuring position which is 20 mm from the work inserting surface in the direction opposite the work moving direction. The temperature in an area extending from the temperature measuring position to the work inserting surface of the die is set to not lower than 1000° C., and the metal drawing rate is not lower than 1300 mm/min and not higher than 1600 mm.

Nickel is cited as an example of the metal component other than iridium. Noble metal chips thus obtained are provided on the free end portion of the central electrode, or the opposing portion of the earth electrode, or both.

According to this noble metal electric discharge chip manufacturing method, the yield of the noble metal electric discharge chips formed from an iridium alloy which is very difficult to plastically deform can be greatly improved. The mechanism making possible such an improvement in yield will be described below.

The noble metal electric discharge chips made of an iridium alloy are formed by drawing out a hot wire as disclosed in the above-mentioned Patent Documents. In this hot wire drawing process, the iridium alloy constituting the worked material is heated red hot and then heated white hot to not lower than the recrystallization temperature thereof. Processing strain applied in a preceding step is thereby eliminated and also the hardness of the material is lowered to make plastic deformation of the material easy. The resultant material in this condition is passed through the die, so that the cross-sectional area of the work decreases. However, when the time during which the temperature is increased to a level of not lower than the recrystallization temperature is long, the crystal grains of the work grow. This causes grain boundaries to become fewer, and when cracks occur, the cracks readily expand. On the other hand, unavoidable impurities gather in the grain boundary, and the grain boundaries which have become fewer in number are liable to become more fragile. As a result, the work becomes unable to resist the tensile stress which occurs when the work is passed through the die, and cracks are liable to occur. It is expected that such cracks will develop and cause disconnection of the wire rod in some cases. In short, in order to carry out the wire drawing process, the hardness of the work must be reduced as the processing strain is eliminated therefrom, so that the temperature has to be increased to the highest possible level. This necessarily prolongs the holding time at a temperature of not lower than the recrystallization temperature. Therefore, it is conceivable that growth of the crystal grains occurs, causing impurities to gather at the grain boundary, so that the worked material becomes fragile. Moreover, when the worked material is not heated uniformly and there are scattered reductions in hardness of the outer surface of the worked material in the circumferential direction, portions that are difficult to plastically deform and portions that are easy to plastically deform are generated. When the worked material in this condition is pulled through the die, the portions that are difficult to plastically deform escape deformation by covering the portions that are easy to plastically deform. This is presumed to cause folding over at the surface of the worked material. It was found that such problems are liable to occur when the time for heating the work is short and when the wire drawing rate is high during execution of a wire drawing process.

The present inventors extensively studied the above-disserted problems, and discovered that while the temperature of the work is increased to a level not lower than the recrystallization temperature, the time that this temperature is maintained is necessarily reduced. Also the wire drawing rate is set to a level that permits suitable tensile stress to be applied to the work. Therefore, the present invention was completed by setting the temperature, temperature maintenance time, and wire drawing rate in the above-mentioned ranges. The temperature in the area between the temperature measuring position and the work inserting surface of the die is shown by average value temperature measurements conducted at the temperature measuring position. Also, the temperature measurements are conducted with a radiation thermometer for the worked material at a position 5 mm from the work inserting surface, in a direction opposite the moving direction of the work. Although the temperature can be measured with a radiation thermometer, the temperature momentarily falls outside the range specified in this invention. Particularly, the temperature during at least 95% of the temperature measuring period is necessarily within the temperature range specified herein.

The effect of the present invention becomes more apparent when the noble metal electric discharge chips contain at least another noble metal in addition iridium. The noble metal electric discharge chips desirably do not contain a base metal at all, although the discharge chips may contain a base metal as an impurity. If a base metal is contained in the noble metal electric discharge chips, the content thereof desirably is not higher than 5 mass %. Namely, when a noble metal electric discharge chip containing another noble metal in addition to iridium, and not containing a base metal except as an impurity or in an amount of not higher than 5 mass % is formed, the effect of the present invention becomes more pronounced. The noble metals may include platinum, rhodium, palladium and ruthenium, and the base metals include nickel, rhenium, niobium, chromium and tungsten. The above-noted noble metals other than iridium suppress oxidation volatility, such that the durability of a spark plug employing noble discharge chips which contain these metals can be improved.

On the other hand, when the raw material contains a noble metal other than iridium, it becomes more difficult to plastically process such alloy as compared to iridium alone. Therefore, when a composition that is difficult to plastically process is used, the effect of the present invention becomes more remarkable. However, when a certain metal (for example, rhodium and tungsten) is used, the plastic processability of the work is improved in some cases more than that of a work containing iridium alone. The present invention does not preclude the introduction of metals that improve plastic processability of the work, and, according to the present invention, such metals rather serve to obtain an enhanced effect. When nickel is added to the work, abnormal corrosion of the iridium alloy can be suppressed. However, because malleability of the iridium alloy decreases, the elastic processing of the work becomes more difficult. Therefore, the noble metal electric discharge chip manufacturing method according to the present invention is a very effective method for improving the yield of nickel-containing noble metal electric discharge chips. Few fine defects exist in the interior of noble metal electric discharge chips manufactured by the method of the present invention. When these chips are fixed to a spark plug, the yield of discharge chips from this fixing operation can also be improved.

Figure 1:
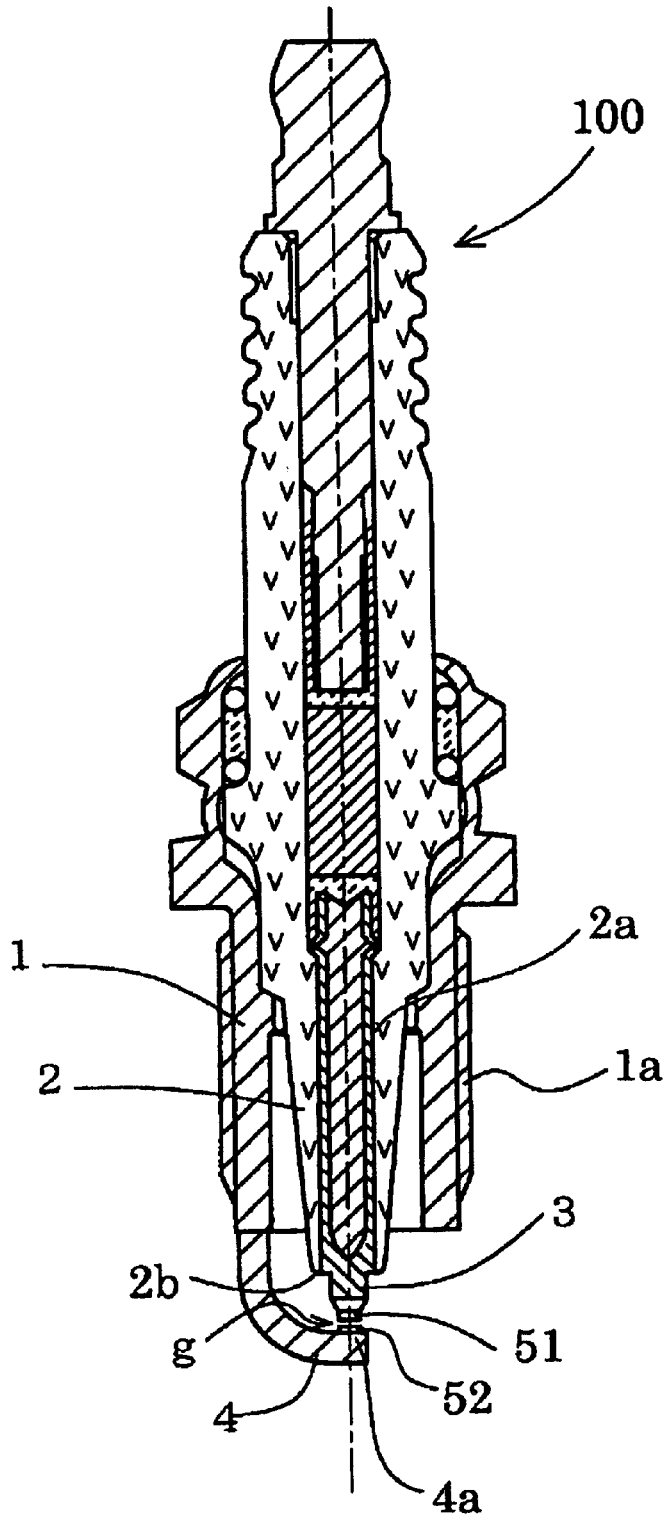
FIG. 1 is a longitudinal cross-sectional view of a center spark plug in accordance with a first mode embodying the present invention.

Reference numerals are used to identify items shown in the drawings as follows:

1. Main metal member

2. Insulator

3. Central electrode

3a. Tip

4. Earth electrode

4a. Opposing portion

51. Noble metal electric discharge chip g. Discharging gap

101. Die

101a. Work inserting surface

102. Worked material

103. Heating area

104. Burners

105. Temperature measuring position

106. Area extending from the temperature measuring position to the work inserting surface.

DETAILED DESCRIPTION OF THE PREFERRED EMBODIMENTS

The present invention is next explained in greater detail by reference for the drawings. However, the present invention should not be continued as being limited thereto.

A spark plug 100 having noble metal electric discharge chips 51, 52 manufactured by the method according to the present invention and fixed to the free end portion 3a of a central electrode 3 or the opposing portion 4a of an earth electrode 4 or both will now be described.

As shown in FIG. 1, the spark plug has a cylindrical main metal member 1, which is provided with a threaded portion la for securing the spark plug to an engine block (not shown). In an inner portion of the main metal member 1, an insulator 2 made of alumina ceramic ($A_2O_3$) or the like is fixed, and the central electrode 3 is fixed in an axial hole 2a of this insulator 2. The insulator 2 is provided so that the free end portion thereof is exposed to the outside of the main metal member 1.

Figure 2:
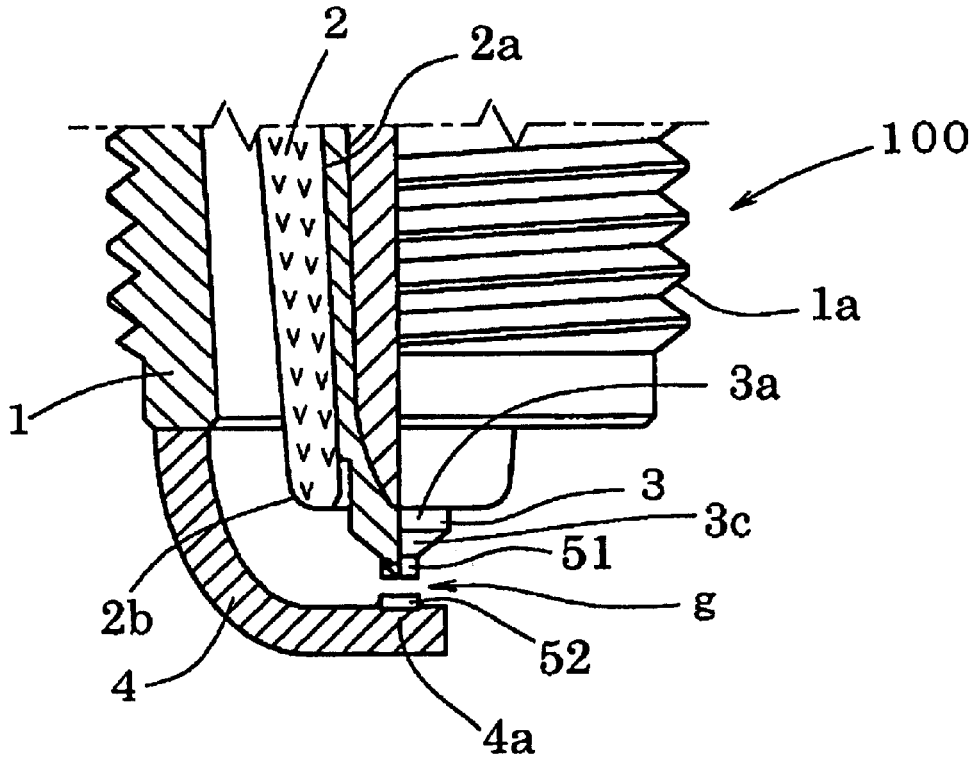
FIG. 2 is an enlarged cross-sectional view of a principal portion of the spark plug shown in FIG. 1.

The central electrode 3 is a cylindrical member including a metal material of high thermal conductivity, such as Cu in an inner portion thereof, and a metal material of high thermal resistance and high corrosion resistance, such as a nickel group alloy, comprising INCONEL 600, covering an outer portion of the first metal material. As shown in FIG. 2, the central electrode is provided so that the free end portion 3a thereof is exposed to the outer side of the tip 2b of the insulator 2. To one end of the main metal member 1, an earth electrode 4 is fixed by welding. This is formed of a metal material such as nickel group alloy made of INCONEL 600, and a discharging gap g is formed between the free end portion 3a of the central electrode 3 and the portion of earth electrode 4 opposing the former.

The central electrode 3 is provided at the front end portion 3a thereof with a noble metal electric discharge chip 51 made of an iridium alloy having the characteristics of the present invention. This noble metal electric discharge chip 51 is formed in a cross-sectionally circular shape. The diameter of the noble metal electric discharge chip 51 is set, for example, to 0.6 mm, and the length thereof to 0.8 mm in order to provide for heat dissipation of the discharge chip 51 and a flame quenching effect of the earth electrode 4.

As shown in FIG. 2, the free end portion 3a of the central electrode 3 is provided with a smaller-diameter portion 3c. On a free end surface of this smaller-diameter portion 3c, a straight portion is further formed. The noble metal electric discharge chip 51 is mounted on the free end surface of this straight portion and can then be fixed thereto by laser welding. The outer diameter of this straight portion is set slightly larger than that of the noble metal chip 51. The laser welding can be done in ten spots at 35° intervals in the circumferential direction of the noble metal electric discharge chip 51.

The noble metal electric discharge chip 52 can be fixed by resistance welding to the opposing portion 4a of the earth electrode 4, which forms the discharging gap g between the opposing portion itself and the free end portion 3a of the central electrode 3. The noble metal electric discharge chip 52 is also cross-sectionally circular, and formed, for example, of 80 mass % platinum and 20 mass % nickel. The diameter of the noble metal electric discharge chip is set, for example, to 0.9 mm (the cross-sectional area is about 0.64 $mm^2$), and the length thereof to 0.3 mm. In general, the noble metal electric discharge chip 51 on the side of the central electrode 3 has a larger consumption due to spark discharge than that of the noble metal electric discharge chip 52 on the side of the earth electrode 4. Therefore, in this mode embodying the invention, only the noble metal electric discharge chip 51 is formed of an iridium alloy, and the noble metal electric discharge chip 52 can be the same as that used in a related art spark plug. When the noble metal electric discharge chip requires consumption resistance, a noble metal electric discharge chip 52 produced by the manufacturing method according to the present invention may be used for the earth electrode 4 as described below.

Figure 3:
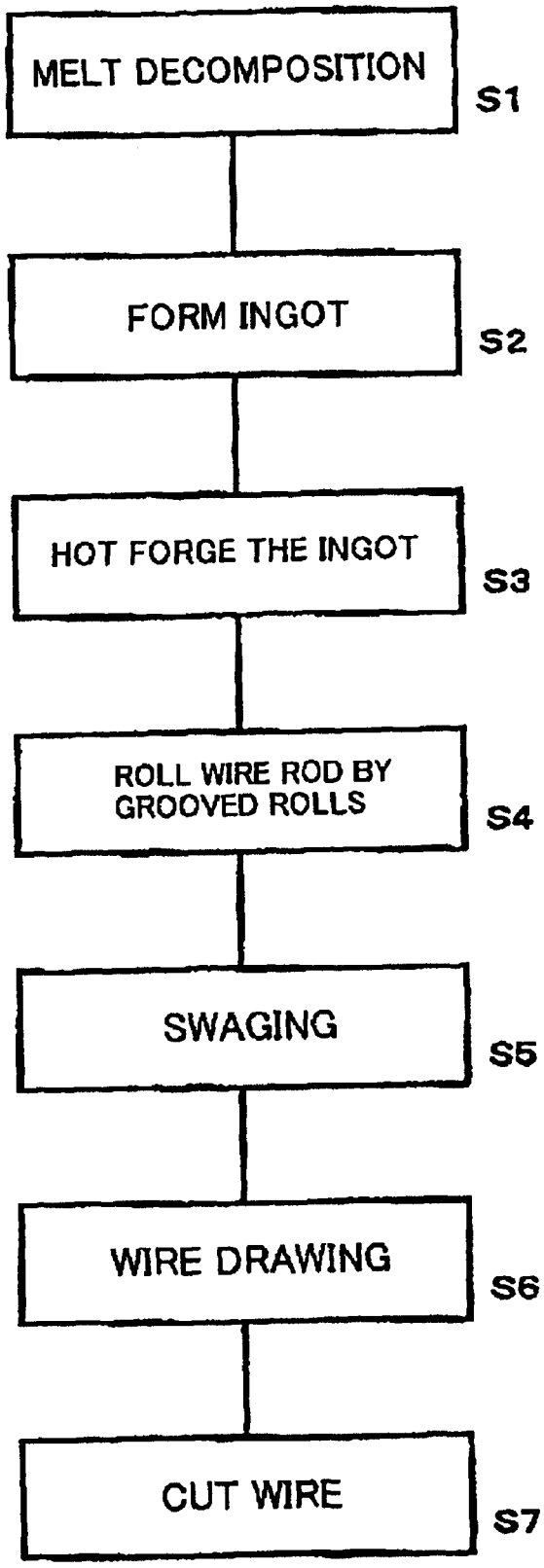
FIG. 3 is a flow diagram showing a method of forming a noble metal electric discharge chip.
Figure 4:
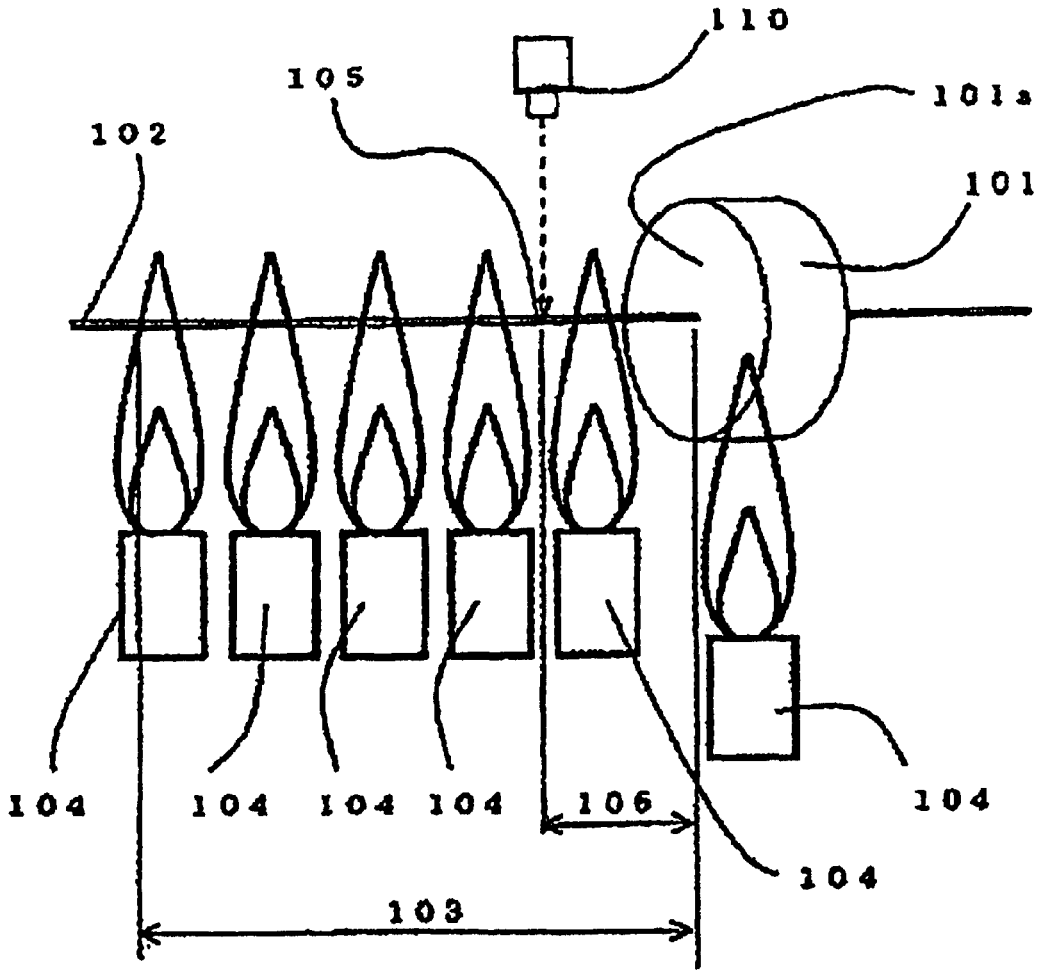
FIG. 4 shows heating and temperature measuring methods in a wire drawing step.

A concrete method of manufacturing the noble metal electric discharge chip 51 will now be described in reference to FIG. 3 and FIG. 4. First, iridium and a metal component other than iridium are arc-melted (S1 in FIG. 3) so that the content of the metal component other than iridium becomes not higher than 35 mass %, to form an ingot (S2 in FIG. 3). This ingot is hot forged (S3 in FIG. 3) to form a rod material having fine fibrous tissue. This rod material is heated, for example, to 1400 to 1450° C. and then the rod material is subjected to hot rolling using grooved rolls and swaging described below. This roll is then subjected to rolling a plurality of times using grooved rolls (S4 in FIG. 3) to form a cross-sectionally hexagonal rod material having a small cross-sectional area. The rolling of the rod material using grooved rolls is done at a rate of 800 to 1400 mm/min.

The rod material is thereafter subjected to swaging (S5 in FIG. 3) to form a circular rod type material. The resultant product is subjected to wire drawing a plurality of times (S6 in FIG. 3) to form a cross-sectionally circular wire rod having a cross-sectional area of not smaller than 0.05 $mm^2$ and not larger than 1.2 $mm^2$, and this wire rod is cut (S7 in FIG. 3) to a predetermined length to form a noble metal electric discharge chip 51. In order to carry out this wire drawing, a heating region is employed as shown in FIG. 4. The heating region 103, which extends 60 mm from a work inserting surface 101a (i.e., the surface of the die 101 used for the wire drawing process into which the work 102 is inserted) opposite the direction in which the work 102 moves, is exposed to the flames of burners 104. At the temperature measuring position 105, which is 20 mm removed from the work inserting surface 101a opposite the work moving direction, the work 102 is heated to not lower than 1000° C. and not higher than 1150° C., and the temperature within the region 106 extending from the temperature measuring position 105 to the work inserting surface 101a is set to not lower than 1000° C. The wire drawing rate is regulated to not lower than 1300 mm/min and not higher than 1600 mm/min. It is recommended that, as shown in FIG. 4, the die 101 or a die block (not shown) for holding and fixing the die 101 thereon and thereto also be heated with a burner 104. The wire drawing rate represents a wire drawing rate of the side of the worked material 102 with respect to the die which is heated, and the wire drawing rate is regulated by adjusting the rotational speed of a take-up drum (not shown) for taking up the work.

Polishing and cutting to a predetermined length a cross-sectionally circular wire rod of a cross-sectional area of not smaller than 0.05 $mm^2$ and not larger than 1.2 $mm^2$ using a wire saw and the like are preferable. This is because burrs, cracks, fine projections and recesses and the like do not occur. A rate of decrease in cross-sectional area of a wire rod according to the present invention, which is subjected to rolling using grooved rolls, swaging and wire drawing, with respect to the diameter thereof is set to not higher than 5%. However, the rate of decrease in cross-sectional area is not limited to this range. For example, a suitable rate of decrease in cross-sectional area may be set on the basis of, for example, the results of experiments. The rate of decrease in cross-sectional area means a percentage calculated in accordance with an expression $[(AO-A)/AO]\times 100$, where AO represents the cross-sectional area of a work which has not yet been subjected to a die-using process; and A represents the cross-sectional area of the work which has been subjected to the die-using process.

The length of the noble metal electric discharge chip 51 preferably is not smaller than 0.5 mm and not larger than 2.0 mm. The reasons are as follows. When the cross-sectional area of the noble metal electric discharge chip 51 is smaller than 0.05 $mm^2$ with the length thereof larger than 2.0 mm, during use of the spark plug, dissipation of heat from the discharging gap g side of the noble metal electric discharge chip 51 to the central electrode 3 is lessened. Also the temperature of the discharging gap g side portion of the noble metal electric discharge chip 51 becomes abnormally high, so that the consumption of the noble metal electric discharge chip 51 increases. In such a case, the requirements of a long-life spark plug may not be satisfied.

When the cross-sectional area of the noble metal electric discharge chip 51 becomes larger than 1.2 $mm^2$, the degree of concentration of the electric field on the side of the discharging gap g of the noble metal electric discharge chip decreases, and the discharge voltage of the spark plug is liable to increase. The flames are formed on the discharging gap g side surface of the noble metal electric discharge chip 51. When the length of the noble metal electric discharge chip 51 is smaller than 0.5 mm, the distance between the flames and central electrode 3 decreases, and the flames are cooled (hereinafter also referred to as a quenching effect) by the central electrode 3. This may cause the igniting effect of the spark plug to decrease.

The best mode for practicing the present invention will now be described in detail with reference to experimental examples. The results of measurement of yields of noble metal electric discharge chips made of iridium and the above-mentioned various other metal components, having a diameter of 0.6 mm and a length of 0.8 mm, and produced by subjecting a worked material to wire drawing at various temperatures, for various periods of time and at various wire drawing rates are shown in the Table below. The experiments were conducted with a rate of decrease in cross-sectional area of the wire rod diameter each in an amount of 3 to 5%. The yields were determined by observing disconnection of the wire rod, the incidence of folding over during a wire drawing process using a die, and the existence or non-existence of cracks of a size exceeding 0.03 mm examined with a flaw detecting penetrant after the wire drawing using a die was completed. In general, in order to carry out a wire drawing process using a die, the free end of the worked material is necessarily made thin so that the work passes easily through the die, and the worked material is fixed by a chuck to the die. Since the portion thus thinned in advance cannot be used as product, the yield cannot be 100%. The other processes are carried out by the above-mentioned methods. The Table shows the composition of worked materials, i.e., the ratio of iridium and the above-mentioned metal components other than iridium, and drawing conditions for the wire rod of each composition with respect to Experiments No. 1 to 31. Those samples marked "*" are outside the scope of the present invention.

| EXPERIMENT NO. | | COMPOSITION | METAL COMPONENTS OTHER THAN IRIDIUM | MASS % | WIRE DRAWING CONDITIONS HEATING RANGE (mm) | WIRE DRAWING CONDITIONS TEMPERATURE (° C.) IN TEMPERATURE MEASURING POSITION |
|---|---|---|---|---|---|---|
| 1 | * | Ir-0.9Rh-1Ni | RHODIUM/ NICKEL | 1.9 | 50 | 1000-1100 |
| 2 | | ↑ | ↑ | ↑ | ↑ | ↑ |
| 3 | | ↑ | ↑ | ↑ | ↑ | ↑ |
| 4 | | ↑ | ↑ | ↑ | ↑ | ↑ |
| 5 | | ↑ | ↑ | ↑ | ↑ | ↑ |
| 6 | * | ↑ | ↑ | ↑ | ↑ | ↑ |
| 7 | * | ↑ | ↑ | ↑ | ↑ | 850-950 |
| 8 | * | ↑ | ↑ | ↑ | ↑ | 1000-1100 |
| 9 | * | ↑ | ↑ | ↑ | ↑ | 1100-1200 |
| 10 | * | Ir-5Pt | PLATINUM | 5.0 | 120 | 1000-1100 |
| 11 | * | ↑ | ↑ | ↑ | 50 | ↑ |
| 12 | | ↑ | ↑ | ↑ | ↑ | ↑ |
| 13 | | ↑ | ↑ | ↑ | ↑ | ↑ |
| 14 | | ↑ | ↑ | ↑ | ↑ | ↑ |
| 15 | | ↑ | ↑ | ↑ | ↑ | ↑ |
| 16 | * | ↑ | ↑ | ↑ | ↑ | ↑ |
| 17 | * | ↑ | ↑ | ↑ | ↑ | 900-1000 |
| 18 | * | ↑ | ↑ | ↑ | ↑ | 1000-1100 |
| 19 | * | ↑ | ↑ | ↑ | ↑ | 1100-1200 |
| 20 | * | Ir-0.9Rh | RHODIUM | 0.9 | 120 | 1000-1100 |
| 21 | | ↑ | ↑ | ↑ | 50 | ↑ |
| 22 | * | Ir-20Rh | RHODIUM | 20.0 | 120 | ↑ |
| 23 | | ↑ | ↑ | ↑ | 50 | ↑ |
| 24 | * | ↑ | ↑ | ↑ | ↑ | 900-1000 |
| 25 | * | ↑ | ↑ | ↑ | ↑ | 1000-1100 |
| 26 | * | ↑ | ↑ | ↑ | ↑ | ↑ |
| 27 | | Ir-11Ru-8Rh-1Ni | RUTHENIUM/ RHODIUM/ NICKEL | ↑ | ↑ | ↑ |
| 28 | | ↑ | ↑ | ↑ | ↑ | ↑ |
| 29 | | ↑ | ↑ | ↑ | ↑ | 1100-1150 |
| 30 | * | ↑ | ↑ | ↑ | ↑ | 1100-1200 |
| 31 | | Ir-5Pt-0.9Rh-1Ni | PLATINUM RHODIUM/ NICKEL | 6.8 | ↑ | 1000-1100 |

| EXPERIMENT NO. | WIRE DRAWING CONDITIONS TEMPERATURE (° C.) IN THE AREA EXTENDING FROM TEMPERATURE MEASURING POSITION TO WORK INSERTING SURFACE | WIRE DRAWING RATE (mm/min) | YIELD (%) | MODE OF CRACKS |
|---|---|---|---|---|
| 1 | 1050-1150 | 1200 | 45 | DISCONNECTION OF WORK |
| 2 | ↑ | 1300 | 70 | |
| 3 | ↑ | 1400 | 80 | |
| 4 | ↑ | 1500 | 80 | |
| 5 | ↑ | 1600 | 80 | |
| 6 | ↑ | 1700 | 50 | FOLDING OVER OF WORK |

-continued

| | | | | |
|---|---|---|---|---|
| 7 | ABOUT 900 | 1400 | 10 | FOLDING OVER AND DISCONNECTION OF WORK |
| 8 | 900-1000 | ↑ | 45 | FOLDING OVER AND DISCONNECTION OF WORK |
| 9 | 1200-1300 | ↑ | 0 | DISCONNECTION OF WORK |
| 10 | 1050-1150 | ↑ | 45 | DISCONNECTION OF WORK |
| 11 | ↑ | 1200 | 45 | DISCONNECTION OF WORK |
| 12 | ↑ | 1300 | 80 | |
| 13 | ↑ | 1400 | 80 | |
| 14 | ↑ | 1500 | 80 | |
| 15 | ↑ | 1600 | 80 | |
| 16 | ↑ | 1700 | 50 | FOLDING OVER OF WORK |
| 17 | 1000-1100 | 1450 | 30 | FOLDING OVER OF WORK |
| 18 | 900-1000 | ↑ | 50 | FOLDING OVER OF WORK |
| 19 | 1200-1300 | ↑ | 20 | DISCONNECTION OF WORK |
| 20 | 1050-1150 | ↑ | 50 | DISCONNECTION OF WORK |
| 21 | ↑ | ↑ | 80 | |
| 22 | ↑ | ↑ | 85 | FOLDING OVER AND DISCONNECTION OF WORK |
| 23 | ↑ | ↑ | 80 | |
| 24 | ↑ | ↑ | 45 | FOLDING OVER OF WORK |
| 25 | 900-1000 | ↑ | 60 | FOLDING OVER OF WORK |
| 26 | 1000-1100 | 1200 | 55 | DISCONNECTION OF WORK |
| 27 | 1050-1150 | 1450 | 80 | |
| 28 | ↑ | 1300 | 80 | |
| 29 | ↑ | 1450 | 80 | |
| 30 | 1200-1300 | ↑ | 30 | FOLDING OVER AND DISCONNECTION OF WORK |
| 31 | 1050-1150 | ↑ | 80 | |

The heating of the work and die [104] *101* was accomplished using the burners 104, and the temperature measurement in the temperature measuring position 105 was conducted with a radiation thermometer 110 having a measuring spot diameter of Ø3. The measuring method using this radiation thermometer 110 was carried out in the following manner. A wire rod having a composition and diameter the same as those of the work is placed in an electric furnace. An emission rate with respect to the diameter of the wire rod is set in advance so that the measured furnace temperature and indicated value of a thermocouple connected to this wire rod, and the value indicated on the radiation thermometer 100 when the temperature of this wire rod is measured therewith, agree with one another. When the work is subjected to wire drawing, the measurement is conducted with the emission rate set in accordance with the diameter of the wire rod. The temperature in the area 106 extending from the temperature measuring position 105 to the work inserting surface 101a of the die 101 is represented by an average value. This average value is a result of temperature measurements conducted in the temperature measuring position 105 and of temperature measurements using the radiation thermometer and conducted in positions up to 5 mm away from the work inserting surface 101a in the direction opposite the work moving direction. It is considered that the moment the work 102 contacts the die 101, the temperature of the work is slightly lowered. Since the measurement is conducted by such a method, the temperature in the region 106 extending from the temperature measuring position 105 to the work inserting surface 101a is specified to be not lower than 1000° C.

The raw materials of Experiments Nos. 10 to 19 contained 5 mass % of platinum as the metal component other than iridium expressed by the composition Ir-5Pt. As shown by the results in the Table, the heating time in Experiment No. 10 (in which the heating region 103 using burners 104 extending from the work inserting surface 101a to a distance of more than 60 mm (namely, 120 mm) away in a direction opposite work inserting surface 101a) was long, and the yield thus obtained was low. On the other hand, the yield was greatly improved in Experiment No. 13 in which the heating area 103 was set within 60 mm (namely, 50 mm) backwards from the work inserting surface 101a.

The yield was also greatly improved in Experiments Nos. 1 to 9. Therein the metal components other than iridium were 0.9 mass % rhodium and 1.0 mass % nickel, expressed as Ir-0.9Rh-1Ni, which are more difficult to process than Ir-5Pt. The present inventors also ascertained that the yield is improved when Ir-0.9Rh, Ir-20Rh, Ir-11Ru-8Rh-1Ni or Ir-5Pt-0.9Rh-1Ni is used. Rhodium is a noble metal allowing for easier plastic processability than iridium alone. The results of Experiments Nos. 22 to 26 show that, using the method of the present invention, the yield can further be improved.

The test results also show that the yield is low in the following experiments using materials of the same composition but outside the scope of the present invention.

1. Experiment Nos. 7, 9, 17, 19, 24 and 30 in which the work 102 was heated in the temperature measuring position 105 to a temperature outside the range of not lower than 1000° C. and not higher than 1150° C.

2. Experiment Nos. 7, 8, 18 and 25 in which the temperature in the area 106 extending from the temperature measuring position to the work inserting surface 101a was lower than 1000° C.

3. Experiment Nos. 1, 6, 11, 16 and 26 in which the wire drawing rate was outside the range of not lower than 1300 mm/min and not higher than 1600 mm/min.

Platinum, rhodium and ruthenium suppress the oxidation sublimation of iridium and improve its oxidation resistance thereof. This improves the performance and prolongs the operating life of the noble metal electric discharge chips and spark plug containing the same.

This embodiment is an example of the best mode for practicing the present invention, but the present invention is not limited thereto. Needless to say, the present invention can be variously practiced within the specified ranges, without departing from the gist thereof. For example, the heating of the die 101 and work 102 can be achieved using suitable methods, such as a high-frequency heating method, a current supplying heating method and a method using an electric furnace instead of the burner-heating method employed in this embodiment. In this embodiment, the noble metal electric discharge chip 51 is welded to the central electrode 3. However, the discharge chip may also be connected to the earth electrode 4.

What is claimed is:

1. A method of manufacturing noble metal electric discharge chips for a spark plug, [said spark plug comprising:

a central electrode, an insulator covering a circumference of the central electrode with a free end portion of the central electrode being exposed, and an earth electrode fixed to the main metal member and having a opposing portion forming a discharge gap g between the earth electrode and the free end portion of the central electrode,]

the method comprising:

wire drawing [an ingot] *a wire rod* of an iridium alloy containing not lower than 0.5 percent by mass and not higher than 35 percent by mass of a metal component other than iridium with a wire drawing die [and rolling] to form a *drawn* wire rod having a cross-sectional area of not smaller than 0.05 $mm^2$ and not larger than 1.2 $mm^2$, and cutting the *drawn* wire rod to a predetermined length to produce a noble metal electric discharge chip for fixing on at least one of [the] *a* free end portion of [the] *a* central electrode *of the spark plug* and [the] *an* opposing portion of [the] *an* earth electrode *of the spark plug opposing the free end portion of the central electrode*, wherein said wire drawing comprises continuously red heating and/or white heating the *wire rod of an* iridium alloy at a portion thereof within a heating region extending from a work inserting surface of the die to a position of predetermined distance opposite the wire drawing direction, the *wire rod of an* iridium alloy being heated to a temperature of not lower than 1000° C. and not higher than 1150° C. at a temperature measuring position which is 20 mm away from the work inserting surface in a direction opposite the wire drawing direction, the temperature in a region extending from the temperature measuring position to the work inserting surface of the die is set to not lower than 1000° C., and the wire drawing rate is not lower than 1300 mm/min and not higher than 1600 mm/min.

2. The method as claimed in claim 1, wherein the metal component other than iridium comprises nickel.

3. The method as claimed in claim 1, which further comprises welding said noble metal electric discharge chip to at least one of [each of] the free end portion of the central electrode and the opposing portion of the earth electrode.

4. The method as claimed in claim 1, which comprises fixing said noble metal electric discharge chip to both [each of] the free end portion of the central electrode and the opposing portion of the earth electrode.

5. The method as claimed in claim 1, wherein said heating region extends from a work inserting surface of the die to within a distance of 60 mm opposite the wire drawing direction.

6. The method as claimed in claim 1, wherein said *wire rod of an* iridium alloy is not heated outside of said heating region extending from a work inserting surface of the die to a position of predetermined distance opposite the wire drawing direction.

*7. The method as claimed in claim 1, which comprises drawing said wire rod a plurality of times to form said drawn wire rod having a cross-sectional area of not smaller than 0.05 $mm^2$ and not larger than 1.2 $mm^2$.*

* * * * *